Jan. 14, 1936.　　　　M. J. LIDE　　　　2,027,597

PULSATING JIG

Filed Sept. 10, 1932　　　5 Sheets-Sheet 1

INVENTOR

M. J. Lide

ATTORNEYS

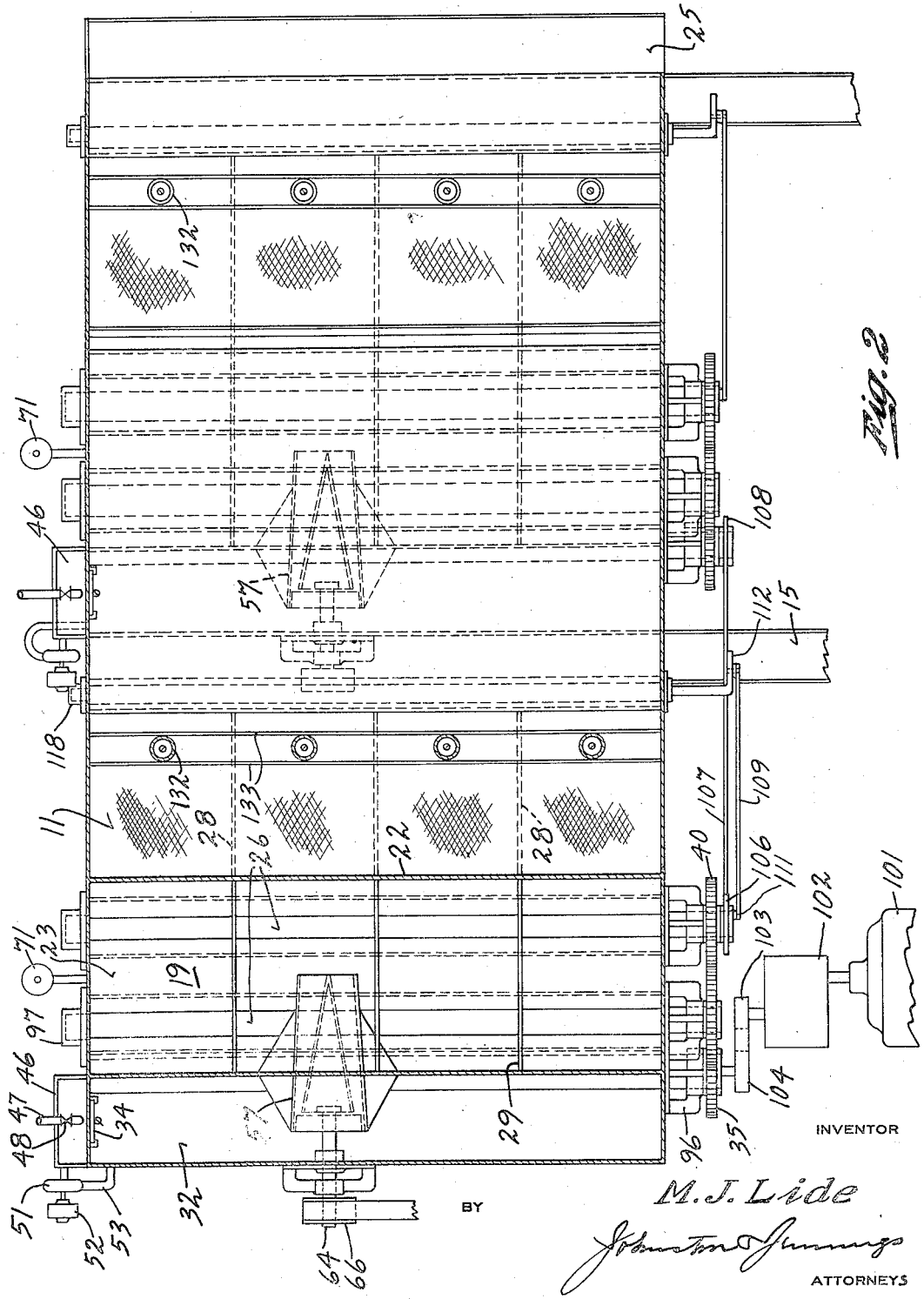

Jan. 14, 1936.    M. J. LIDE    2,027,597
PULSATING JIG
Filed Sept. 10, 1932    5 Sheets-Sheet 3
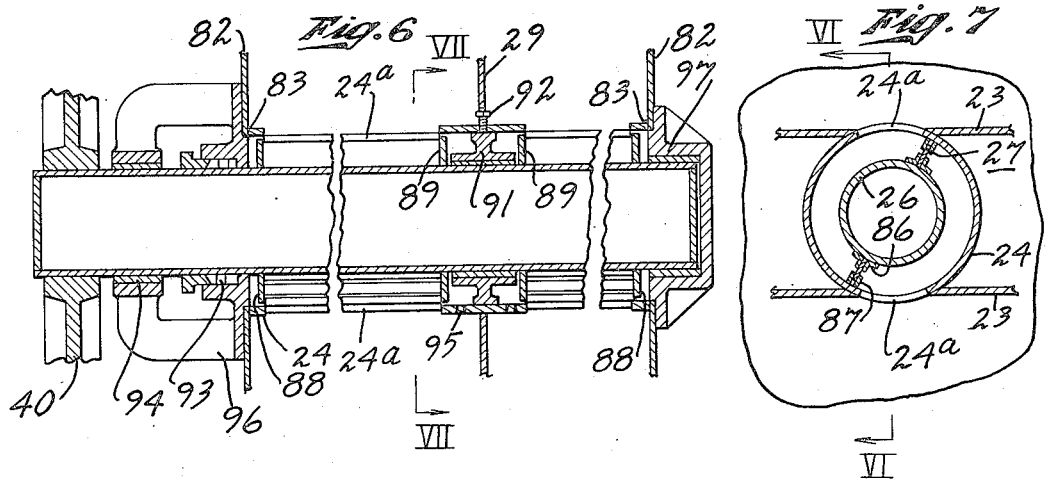
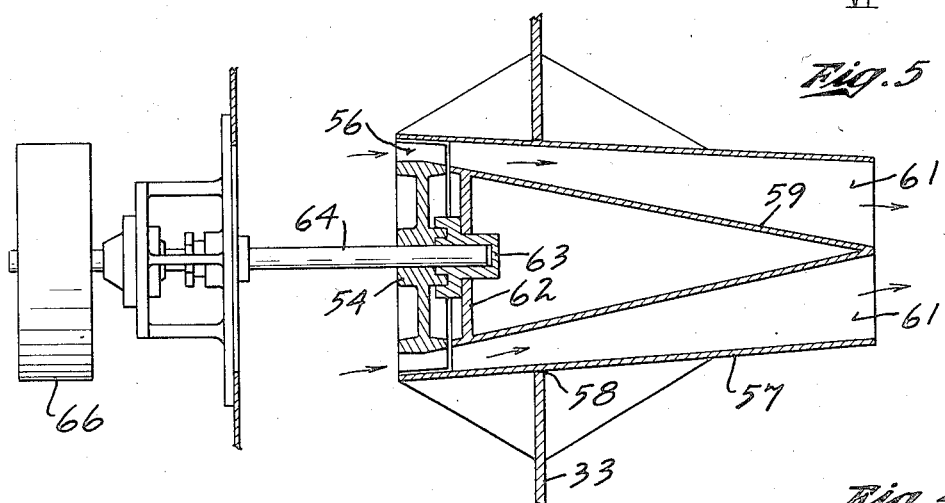
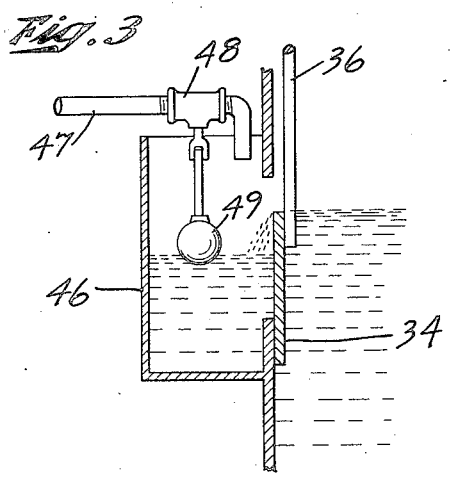
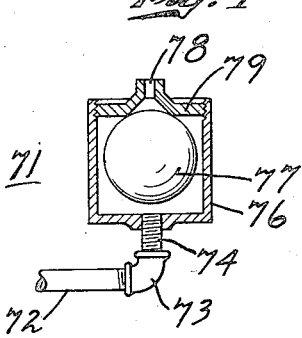
INVENTOR
M. J. Lide
BY
Johnston Jennings
ATTORNEYS

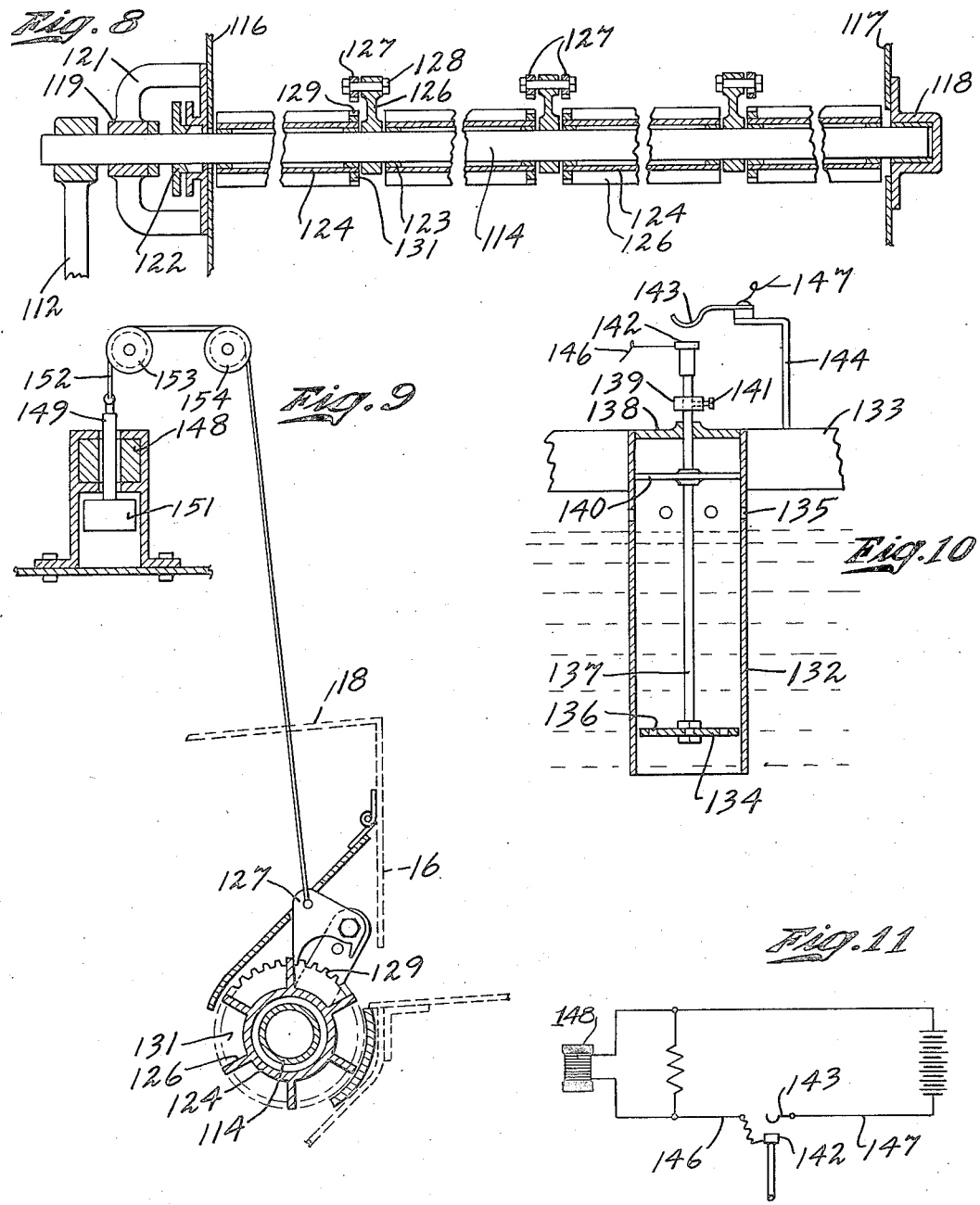

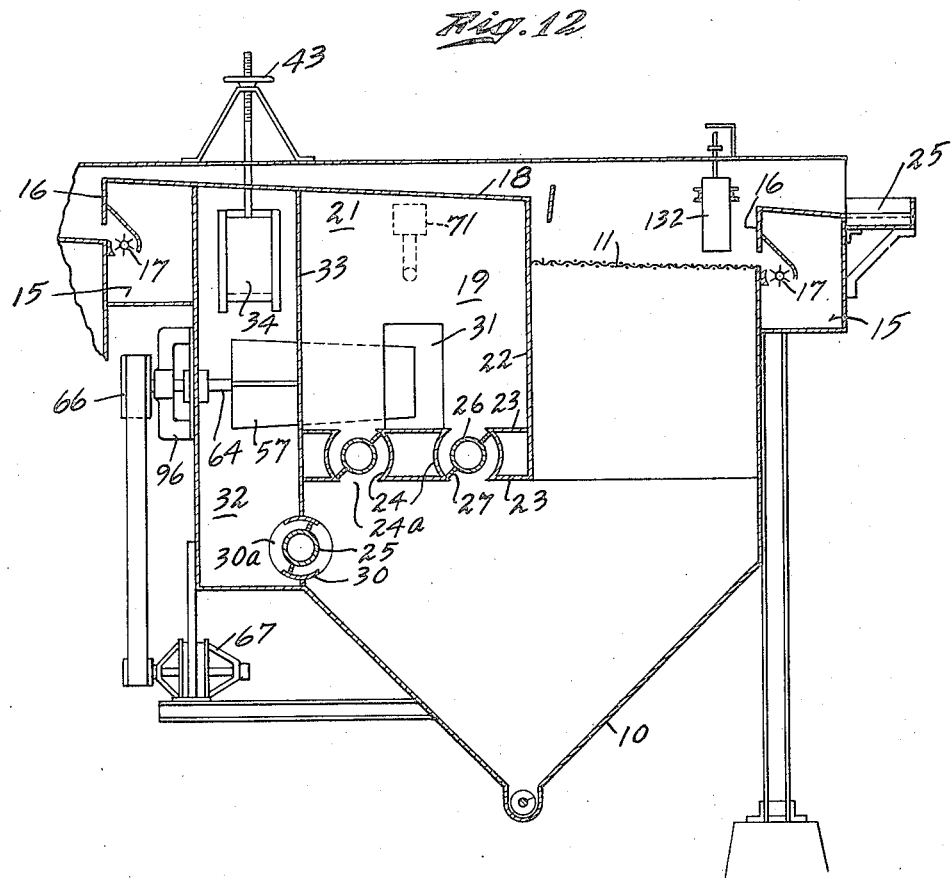
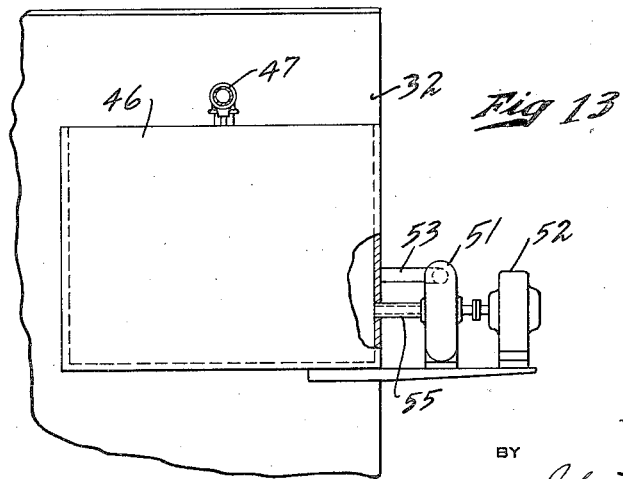
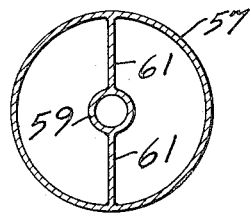

Patented Jan. 14, 1936

2,027,597

UNITED STATES PATENT OFFICE 2,027,597

PULSATING JIG

Martin J. Lide, Birmingham, Ala.

Application September 10, 1932, Serial No. 632,581

27 Claims. (Cl. 209—455)

My invention relates to jigs, and has for its object the provision of apparatus of the character designated which shall be simple and economical of construction and operation, and which shall combine the features of high output capacity, coupled with maximum efficiency in the separation of materials of different specific gravities.

A further object of my invention is to provide a jig embodying means for effecting quick upward impulses of water through the jig screen, followed by a relatively long settling period with a minimum velocity flow of water downwardly through the screen during the settling period.

A still further object of my invention is the provision of a jig embodying a quick pulsion period, a relatively long settling period, and independent means for adjusting the downward or suction velocity flow of water through the screen during the settling period, and the upward velocity flow of water through the screen during the pulsion period.

Still further object of my invention is to provide a jig in which the relation of the pulsion period to the settling period is fixed, and in which the suction intensity and volume may be varied without affecting said relation.

Another object of my invention is to provide a jig in which the intensity of the pulsion velocity and of the suction velocity are independent of each other and may be independently adjusted.

A still further object of my invention is to provide a jig in which the volume of circulating water may be varied without varying the relation of the pulsion period to the settling period.

A further object of my invention is to provide a multi-stage jig in which the volume of circulating water passing over the weir of a succeeding stage is independent of the volume of water received from a preceding stage.

Another object of my invention is the provision of an improved means for removing the heavier materials from the screen, together with an automatic control therefor responsive to the depth of the bed of such materials on the screen.

As is well known, a jig is an apparatus in which particles of materials of different specific gravities resting on a screen are successively propelled upwards in water and are allowed to settle, during which time they separate vertically in accordance with their relative settling velocities. The following data taken from Prochaski's work on Coal Washing illustrate the separation of particles of material of different specific gravities while settling (1) in an ascending current of water, (2) in still water, and (3) in a descending current of water. The particles chosen for the experiment each had a diameter of 4 mm. and their specific gravities were 2.6 and 7.5 respectively.

| | Separation in mm. | |
|---|---|---|
| | Settling time ¼ second | Settling time ½ second |
| (1) Ascending current, velocity ¼ meter per second | 76.6 | 181.2 |
| (2) Still water | 65.8 | 171.4 |
| (3) Descending current, velocity ¼ meter per second | 61.4 | 165.1 |

From the above table, it will be seen that by increasing the settling period from ¼ to ½ second, the amount of separation is increased about two and one-half times in each instance, whether the settling is taking place in an ascending current, a descending current, or in still water.

It is accordingly obvious that the longer the settling period in each cycle the greater the separation of particles during that cycle. Inasmuch as the amount of separation during each cycle is necessarily small, it will furthermore be obvious that it is important that the greatest possible number of cycles be imparted to the particles in their travel over the screen. It follows therefore that an ideal jig is one combining a relatively short pulsion period, a relatively long settling period, and a maximum number of cycles per pass of material over the screen, consistent with volume of output.

Another important factor in the separation of materials of different specific gravities in jigs, is that the velocity of the down flow of water through the screen during the settling period should be as low as possible. Referring again to Prochaski's work on "Coal Washing", it was observed that the lighter particles, with a one-half second settling period, fell 184.2 mm. in still water and 289.5 mm. in water having a downward velocity of one-fourth meter per second. This phenomenon accounts for the difficulties encountered by all jig operators in practice where the down flow velocity of water through the screen becomes excessive and the lighter particles are drawn down into the bed of heavier particles resting on the screen.

It is a recognized prerequisite in jigs that there be at all times a sufficient flow of circulating water over the weir for the lighter particles to be floated over and carried away. In actual practice, as much as 75% of the water passing upwardly through the screen on the pulsion stroke may be drawn downwardly through the screen during the settling period, the remaining 25% overflowing the weir and constituting the circulating water which must be supplied.

The amount of water flowing over the weir determines the horizontal velocity of material over the screen, and thus determines, to a large extent, the capacity of the jig. It also is a function of the number of pulsations to which the material is subjected while on the screen. With a fixed number of pulsations per minute, the greater the amount of water flowing over the weir, the greater will be the output of the jig, and the fewer the pulsations to which the material is subjected.

Bearing in mind that the major separation of materials occurs during the settling period in a given pulsion and settling cycle, it will at once become apparent that, with a given horizontal velocity of water over the screen, the pulsion or upward flow should persist during the minimum possible portion of the cycle, and the settling period should consume the maximum possible portion of the cycle. By this means, the greatest possible number of pulsations and the highest degree of separation for a given rate of travel of material over the screen may be obtained.

In all jigs, as heretofore known to me, circulating water has been admitted to the jig hutch. It will be apparent, however, that the circulating water thus introduced is imposed upon the circuit of water pulsing upwardly and downwardly through the screen and thus increases the velocity of the upward, or pulsion flow of water through the screen, as well as the interval of time consumed in the pulsion flow, and decreases the settling period as well as the velocity of the downward flow of water through the screen. Any variation in the amount of circulating water thus introduced affects the velocity of the pulsion flow and the interval and velocity of the down flow of water through the screen.

From a consideration of the foregoing, it will be apparent that the features most to be desired in a jig are a quick, upward flow of water through the screen with a velocity sufficient to raise the particles on the screen, followed by a relatively long settling period with a minimum velocity flow of water downwards through the screen. It is also important that the material be subjected to the maximum possible number of pulsations in its travel over the screen. In order that these basic functions may be best suited to the material being separated, it is important that they be independently adjustable.

All of the before enumerated desirable features are embodied in my improved jig, which is about to be described. Briefly, my improved jig comprises a pulsion tank preferably constructed to provide an air chamber in its upper portion, and provided in its lower portion with a suitable number of rotary valves such as are described and claimed in my Reissue Patent No. 17,272, issued April 16, 1929. Alongside the pulsion tank I provide a screen elevated with respect to the rotary valves, whereby to provide a flow of water of uniform intensity through the screen during the pulsion period.

On the other side of the pulsion tank I provide a suction tank into which the return flow of water enters during the settling period. The suction tank is provided with means whereby its level may be regulated and maintained at any constant level as high as the discharge weir from the screen, or to any desired level below the screen. The flow of water into the suction tank is controlled by a rotary valve having an opening period of any desired ratio to that of the opening period of the pulsion valves, whereby the settling period of the jig with relation to the pulsion period is determined. I provide a pump between the suction tank and the pulsion tank adapted to discharge a variable quantity of water into the pulsion tank under pressure of the air in the chamber in the upper portion of the pulsion tank, which determines the intensity and volume of water discharged upwardly through the screen.

The circulating water in my improved jig is supplied through the suction tank, which, as before explained, is maintained at a constant level, and the volume of circulating water supplied and falling over the weir, does not affect either the pulsion intensity, the pulsion interval, or the settling interval. It does, however, control the downward velocity of water through the screen during the settling period, for a given pulsion velocity.

This latter feature is important in the application of my invention to a multi-stage jig wherein the circulating water from the first stage passes to the next succeeding stage, and is delivered along with the material from the preceding stage on to the screen of the succeeding stage. In jigs as heretofore known to me, in the succeeding stages, the circulating water passing over the weir was necessarily the total of water coming from a preceding stage, with possibly some pulsion water. Inasmuch as all of the heaviest material has been removed from the material being separated in the first stage, it is obvious that so much circulating water is not required in the later stage, because a lighter and lesser volume of material is to be carried over the weir with the circulating water.

In accordance with my invention, I provide separate pulsion and suction tanks for all the stages of the jig. The level of the water in each of the suction tanks may be maintained at any desired relation to the screen, so that all of the circulating water from a preceding stage may go over the weir of a later stage, or the level of the suction tank may be lowered to a point where all of the circulating water may be sucked down through the screen and pass out through the suction tank. By these means, the treatment of materials on the second stage of the jig may be regulated and adjusted so as to procure the highest efficiency of operation.

Another improved feature of my invention is the provision of improved means for controlling the removal of heavier materials from the bed of materials being treated. This comprises a plurality of gate sections extending across the discharge end of the screen, each controlled by a feeler element so constructed that it raises in response to an increase in the depth of heavier materials on the screen, and causes a ratchet mechanism to operate its associated rotary gate section to remove the heavier materials from that section of the screen. When the level of the heavier material falls, the ratchet mechanism is disengaged accordingly, and the rotary gate remains stationary until the bed of heavy material again increases in depth to an amount sufficient to cause the ratchet mechanism to be re-engaged.

Apparatus embodying features of my invention is illustrated in the accompanying drawings forming a part of this application, in which Fig. 1 is a side elevation of a two stage jig constructed in accordance with my invention;

Fig. 2 is a sectional plan view of the same, taken along the line II—II of Fig. 1;

Fig. 3 is a detail sectional view illustrating the means for maintaining the constant level in the suction tank and the supplying of circulating water;

Fig. 4 is a detail view showing the means for preventing excess air volume in the pulsion tank;

Fig. 5 is a detail sectional view of the pump employed to supply water to the pulsion tank;

Fig. 6 is a longitudinal sectional view of one of the rotary pulsion valves, taken along the line VI—VI of Fig. 7;

Fig. 7 is a sectional view taken along the line VII—VII of Fig. 6;

Fig. 8 is a longitudinal sectional view of the slate gate mechanism in my improved jig;

Fig. 9 is a sectional view illustrating the ratchet control for the slate gate;

Fig. 10 is a sectional view of the float element employed with the slate gate;

Fig. 11 is a diagram of the circuit employed with the slate gate control;

Fig. 12 is a vertical cross section of the second stage jig unit shown in Fig. 1;

Fig. 13 is an enlarged side elevation of the supply tank for makeup water and the pump associated therewith; and Fig. 14 is a cross section of the pump shown in Fig. 5.

Figure 1:
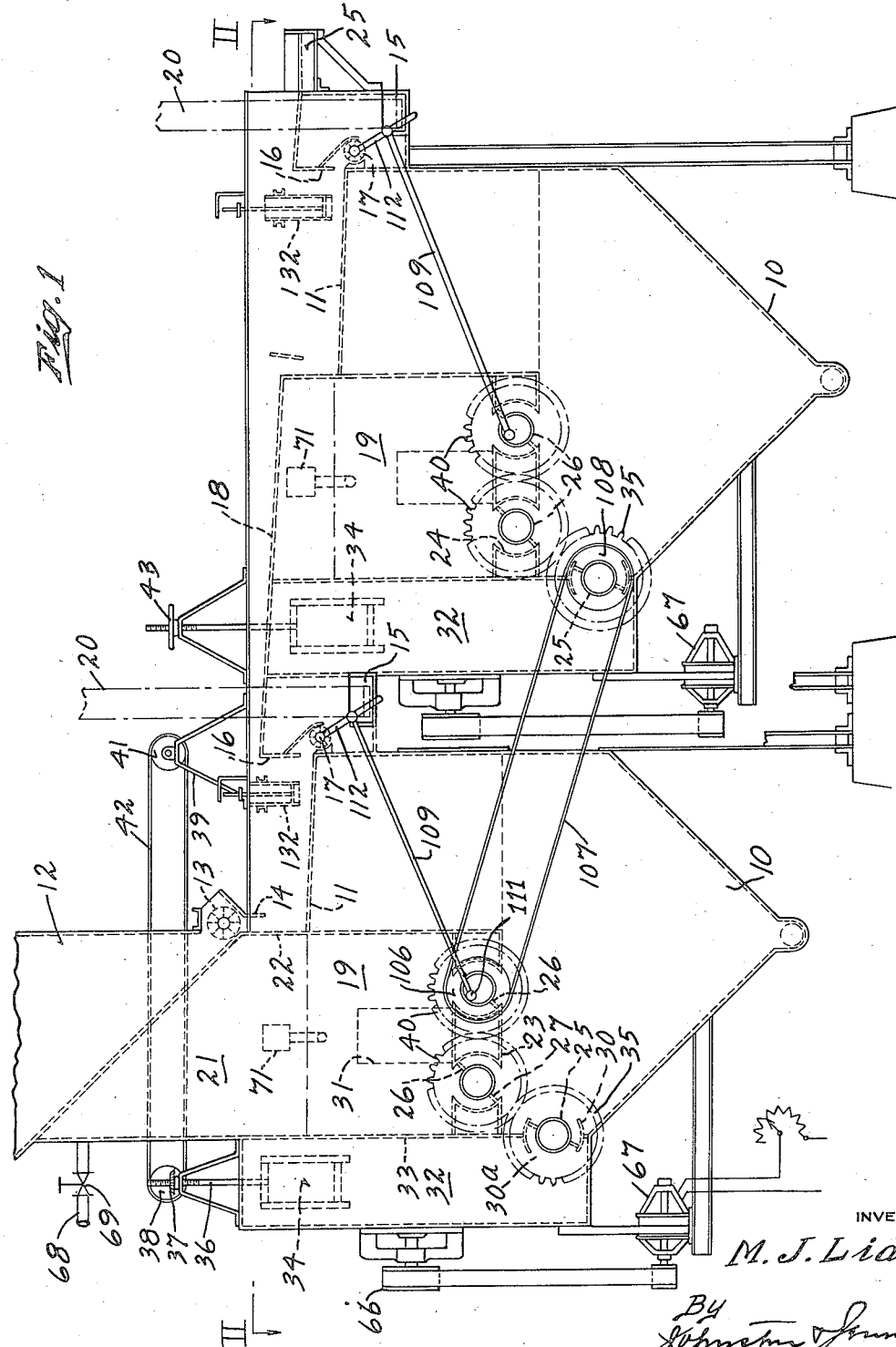

Referring to the drawings, my improved jig as shown comprises two stages, each of which is a substantial duplicate of the other, and a description of one will suffice for the two. Each unit consists of a hutch 10 having a screen 11 over one side of the hutch, on which material to be separated is fed from the raw material bin 12 through a rotary feeder 13. A plate 14 extends across the screen in front of the rotary feeder whereby the material being fed is caused to fall on the feed end of the screen and thus be subjected to the maximum number of pulsations in its travel over the screen.

After being subjected to treatment on the screen, the heavier fraction passes out underneath a weir 16 at the discharge end of the screen to a rotary gate 17 for heavier materials. The heavier materials are delivered into a sluice 15 from which they are removed by a conveyer 20. The lighter fraction of material passes over the weir 16 with the circulating water and is carried over a plate 18 to the feed end of the next succeeding stage. After being treated in the last stage, the lighter fraction passes into a sluice 25, and is removed therefrom in any suitable manner, not shown. The circulating water from the sluice is returned to the first stage suction tank, in any suitable manner.

Along the feed end of the screen 11 and coextensive in length with the width of the screen, is a pulsion tank 19 comprising in its upper portion 21 an air sealed chamber. The inner wall 22 of the pulsion tank extends downwardly below the screen 11 a distance substantially equal to the length of the screen. The bottom of the pulsion tank is defined by a double wall 23, in which are located a pair of cylindrical rotary valve casings 24. Adapted to rotate in each of the casings 24 are valves, each comprising a central cylindrical body member 26 and butterfly vanes 27. The casings 24 are provided with elongated ports 24a, and the opening defined by these ports into the pulsion tank and into the hutch 10 are predetermined in order to provide a predetermined pulsion interval for each revolution of the valve. This interval may be of any desired value, according to the material to be treated, and in the example shown is substantially 45°, so that for every revolution of the valve 26, it establishes communication between the pulsion tank and the hutch one-fourth of the time.

The location of a plurality of rotary valves in the bottom of the pulsion tank serves to stream line the flow of the pulsion water, and hence to reduce its hydraulic inertia. And when the bottom of the tank is also depressed below the screen level, the hydraulic inertia of all sections under the screen tends toward equalization.

Where the screen 11 is of considerable width with respect to its length, as shown in Fig. 2 of the drawings, it is necessary to supply staying means for the hutch and for the pulsion tank. This may be accomplished by providing plates 28 extending transversely of the hutch to each screen, and plates 29 extending transversely of the pulsion tank. Equalizing ports 31 are provided in the plates 29 whereby to maintain the water level and pressure constant in the pulsion tank.

Along the front of the hutch 10 and alongside the pulsion tank 19 I provide a suction tank 32. Preferably the rear wall 33 of the pulsion tank forms the front wall of the suction tank. The level of water in the suction tank may be maintained at any desired height by means of overflow gates 34 provided in the upper part of the suction tank. The overflow gate 34 for the first stage may be raised and lowered by means of a screw 36 operated through gears 37 and sprocket 38 from a stand 39 mounted above the screen 11 and provided with a manually operated sprocket 41 convenient to the operator and connected to the sprocket 38 by means of a chain 42. The overflow gates for the suction tank of the second stage may be regulated directly by the operator by means of a screw and wheel mechanism 43.

In the side of the suction tank 32 near its bottom I provide a rotary suction valve 25 coacting with a cylindrical casing 30 having elongated ports 30a therein to connect the suction tank 32 with the hutch 10 during the settling period of the jig. The head of water in the suction tank 32 is ordinarily maintained below the level of the screen 11 whereby, during the settling period, water flows downwardly through the screen, through the suction valve 25 into the suction tank 32, and from thence through the overflow gate 34 out of the suction tank.

The suction valve 25 and the rotary pulsion valves 26 are connected together by means of gears 35 and 40, whereby they are driven in synchronism and are so arranged that when the pulsion valves are open, the suction valve is closed, and when the pulsion valves are closed the suction valve is open. The design of the suction valve is similar to that of the pulsion valves and the ports 30a of the suction valve are designed with any desired opening, whereby to provide a predetermined interval of opening per revolution.

As shown in the drawings, the degree of opening of the suction valve 25 is approximately 135°, whereas that of the pulsion valves 26 is approximately 45°. With this arrangement, therefore, during a given pulsion-settling cycle of the jig, the suction period is three times that of the pulsion period.

It will also be obvious that the overflow gates 34 provide means whereby the proportion of water passing downwardly through the screen 11 during a cycle may be varied within desired limits. If the level of water in the suction tank 32 be maintained slightly above the height of the overflow weir 16, all of the water passing through the pulsion valves 26 will flow over the weir. On the other hand, the overflow gate 34 may be lowered to such an extent that none of the water passing through the pulsion valves 26 will flow over the weir, but will all be drawn into the suction tank 32 upon the opening of the suction valve 25. By means of the adjustment which I provide, therefore, the degree and intensity of the suction interval may be quickly regulated to adapt the jig to the separation of widely varying classes of material.

At one end of the suction tank 32 I provide a supply tank 46 into which the overflow gate 34 opens. Makeup water enters the supply tank 46 from any suitable source through a conduit 47 (see Fig. 3) controlled by a valve 48 and float 49 whereby the level in the supply tank 46 is maintained constant. Alongside the supply tank 46 is a pump 51 driven by a motor 52 and connected to the supply tank 46 through a conduit 55 and to the suction tank 32 by a conduit 53, which transfers water from the supply tank to the suction tank. The excess water going into the suction tank overflows through the gate 34 back to the supply tank. By the means just described, the level of water in the suction tank remains constant and the circulating water and water for pulsion is supplied.

In Fig. 5 of the drawings, I show a sectional view of a preferred form of pump for transferring water from the suction tank to the pulsion tank. This pump comprises a rotor element 54 carrying vanes 56 of the propeller type and adapted to discharge water axially, as shown by the arrows. The pump is provided with a cylindrical or frusto-conical casing 57, converging toward its discharge end, and mounted in an opening 58 of the common wall 33 between the pulsion and suction tanks.

In order to provide a velocity pressure conversion of the water entering the pulsion tank 19, I provide in the casing 57 a fairing cone 59 with its apex terminating at the outlet end of the casing 57, and its base at the discharge end of the blades 56. The diameter of the base of the cone 59 is made equal to the diameter of the rotor element 54 at the base of the vanes 56. The cone 59 is supported in the casing 57 by means of radially disposed, longitudinally extending plates 61.

Carried in the base of the cone 59 is a plate 62 in which a bearing 63 is mounted. The bearing 63 carries a pump shaft 64 which is driven through a pulley 66 from a variable speed motor 67.

Pumps of the general character described are well known as having a relatively large volume capacity at low heads and the construction just described provides a means for furnishing a variable supply of water to the pulsion tank. The water carried in by the pump, as is well understood, contains considerable air in solution which separates out from the water under pressure in the pulsion tank to provide the necessary make-up volume of air in the air chamber 21 forming the upper portion of the pulsion tank 19. When starting the jig after a period of idleness, it may be necessary to supply an initial air pressure in the chamber 21. This I accomplish by means of a conduit 68 controlled by a valve 69.

In order to prevent an excess of air volume in the upper portion 21 of the pulsion tank 19, I connect to the pulsion tank 19, at a suitable distance above the normal water level therein, indicated by the dotted line, an automatic air discharge valve 71. The automatic discharge valve 71 is shown in detail in Fig. 4, and comprises a pipe connection 72 which is fitted into the wall of the pulsion tank, an elbow 73 and a vertical nipple 74, to which is secured a cylindrical valve casing 76. In the valve casing 76 is a ball valve 77 which, so long as the water level in the pulsion tank 21 is above the connection 72, floats and closes a port 78 in the cover 79 of the valve casing. When the water level falls below the connection 72, the ball valve 77 drops and permits air to escape through the port 78.

By the means just described, if the air volume in the pulsion tank becomes excessive, it will lower the water level in the pulsion tank to a point below the discharge valve 71, and the ball valve 77, then acting in the manner described, effects a release of the air, permitting the water level to again rise above the discharge valve.

The provision of the air chamber in the pulsion tank 19 above the water is very important in reducing the inertia of the water column passing through the pulsion valves 27 during the pulsion period of the jig. When the pulsion valves 27 have been opened, and water flows through them to pass into the hutch 10 and up through the screen 11, the valves, upon closing, have to withstand the inertia of this moving column of water. By maintaining the height of the column as low as possible, with an air pressure employed to force the water through the valves, it will be apparent that this inertia is greatly decreased over a pulsion tank depending for its pressure upon a higher column of water open to the atmosphere.

Referring to Figs. 6 and 7, I show in detail the preferred construction of the pulsion valves. This construction may be followed in designing the suction valves, as heretofore explained.

The cylindrical valve casings 24 extend the entire length of the pulsion tank, as shown in Fig. 6, and are joined to the end walls 82 of the pulsion tank, as by welding, as shown at 83. The ports 24a defining the interval of opening of the rotary valves are cut through the cylinder walls and are of a length corresponding to the width of the compartments of the pulsion tank defined by the end walls and the partitions 29.

The central cylindrical body members 26 likewise extend the full length of the pulsion tank. The butterfly vanes 27 are made in sections corresponding to the length of the ports 24a and are joined to the body portion by means of angle members 86. To the outer ends of the vanes 27 are attached longitudinally extending packing strips 87, one on each side of each vane, which have a relatively close clearance with respect to the casing 24 when the valve is closed, whereby to provide a water packing seal along the vanes.

Mounted on the body portion 26 of the valve, and slidingly fitting within the cylindrical casing 24 at the ends of the vanes in each compartment of the pulsion tank are disks 88 which are secured to the ends of the vanes 27, thus defining a section of the valve in each compartment of the pulsion tank.

At each partition 29 a pair of the disks 89 are thus disposed on opposite sides of the partition and mounted between them is an intermediate bearing 91 supported by the partition 29 and forming an intermediate bearing support for the cylindrical body portion 26. The bearings 91 are held in position and against rotation by means of set screws 92.

At the driving end of the valve, I provide a stuffing box 93 to prevent outside leakage of water from the pulsion tank, and beyond this a bearing 94 supported from the end wall 82 by means of a yoke 96. The other end of the cylindrical body portion of the valve is supported in a closed bearing 97.

It will be seen that the disks 88 and 89 serve as packing to prevent the escape of water from around the ends of the vanes 27 when the valve is in a closed position, and also prevent water from washing lubricant away from the valve bearings. The spaces between the disks 89 and between the disks 88 and the end walls should be provided with drains 95.

The drive for my improved jig may comprise a suitable motor 101 connected to a gear reduction box 102, and from there through sprockets 103 and 104 to one of the pulsion valves 26. As already mentioned heretofore, the gears 40 and 35 on the pulsion and suction valves mesh so that the pulsion valves and suction valves are driven in synchronism. Carried by the rear gear 40 of the first stage is a sprocket 106 connected by a drive chain 107 with a similar sprocket 108 carried by the front gear 40 of the second stage of the jig, whereby both stages are driven together.

The slate or refuse gate 17 is driven from the forward gear 40 of each stage by means of a pitman 109 connected to a crank 111 on the gear shaft and leading to a depending arm 112 of a ratchet mechanism, to be described later.

From the foregoing description, the operation of my improved jig, as so far described, will be readily understood. Materials to be separated, which may be ore mixed with lighter materials, or coal mixed with heavier materials, is fed from the bin 12 through the rotary feeder 13, where it falls behind the plate 14 on the end of the screen remote from the discharge end. The pulsion and suction valves are driven in synchronism, whereby the material on the screen is subjected to relatively short periods of upward pulsations of water followed by relatively long periods of settling when the pulsion valves are closed and the suction valve open. The intensity of the pulsion impulse can be varied by varying the speed of the motor 67 driving the pump 54, forcing water from the suction tank into the pulsion tank.

The velocity of downflow of water through the screen during the settling period is adjusted independently of the pulsion velocity by means of the overflow gates 34 in the suction tank 32. This, as has already been explained, may be adjusted so that all of the pulsion water passes over the discharge weir 16, or any part may be drawn downwardly through the screen back into the suction tank and through the overflow gate 34. Circulating water is furnished through the suction tank from the supply tank 46 and circulating water supply 47.

The lighter materials pass with the overflow water over the discharge weir 16 of the first stage and thence over the plates 18 to the second stage screen where the treatment just described is repeated. The flow of pulsion water, and the control of the downflow of water through the screen during the settling period, is regulated independently of the first stage and may thus be adjusted to handle the larger proportion of lighter material being treated in the second stage, so as to procure the highest efficiency of separation.

The details of the refuse or slate gate 17, and the manner of operating, are illustrated in Figs. 8 to 11, inclusive, and will now be described. The slate gate mechanism comprises a shaft 114 extending across the screen the full width thereof and supported in the end walls 116 and 117 of the sluice 15 by means of bearings 118 and 119. The bearing 119 is supported from the end wall 116 by means of a suitable yoke 121. A stuffing box 122 prevents leakage of water out of the sluice box through the end wall 116.

Mounted on the shaft 114 at suitable intervals along its entire length are wearing sleeves 123 on which are rotatably mounted slate gate body members 124. The body members 124 are of cylindrical form, and carry radial vanes 126 which may be secured thereto as by welding.

In the case of a jig having a very wide screen, for example, a screen having a width of around twenty feet, I provide a number of these sections, in the example shown four. Between each of the sections, I mount a ratchet arm 126 carrying a pawl 127 pivotally mounted thereon, as by means of a bolt 128. The pawl 127 is adapted to engage the teeth 129 of a ratchet 131 carried by each of the gate sections.

As has already been described, the shaft 114 is continuously oscillated through the arm 112 and, upon engagement of either of the pawls 127 with its associated ratchet 131, that section of the slate gate may be rotated on the shaft independently of the other sections.

The operation of each section of the slate gate is controlled independently of the others in response to the depth of the slate bed on the jig screen 11. Opposite each of the sections is a cylinder 132 fixedly mounted above the screen by suitable supports 133 extending transversely of the screen. The cylinder 132 extends downwardly above the screen to a point where it is below the normal level of the slate bed. Mounted in each of the cylinders 132 is a float or feeler element 134 provided with perforations 136, similar to the perforations of the screen, whereby the water pulsations flow upwardly and downwardly through the perforations at each pulsion-settling cycle of the jig. The cylinder 132 is also provided with a series of perforations 135 in its upper portion above the water level to permit egress and ingress of air during the water pulsations. The slate level is accordingly maintained at substantially the same depth in the cylinders 132 as it is on the screen outside the cylinders.

Attached to the float or feeler element 134 is a rod 137 which extends upwardly through the end of the cylinder 132. The rod 137 passes outwardly at the top through a substantially air tight cover 138. A collar 139 is secured on the rod 137 by a set screw 141, which serves the function of providing sufficient weight for the float element and for limiting its downward movement.

In order to prevent the float element 134 from moving quickly upwards at each pulsation of the jig, I provide an air dash pot for the float which may comprise a piston 140 fitting snugly in the upper end of the cylinder 132 and which operates at each pulsion of the jig to compress the air between it and the head of the cylinder.

When the slate bed at either of the cylinders 132 raises sufficiently it carries the float element 134 upwardly with it, and a contact 142 carried on the upper end of the rod 137 engages a contact 143 carried by a stationary support 144. The contacts 142 and 143 are joined to wires 146 and 147 forming part of an electric circuit leading to a solenoid winding 148. The winding 148 has a core 149, the lower end of which is attached to a weight 151. Connected to the weight 151 is a cord 152 leading over pulleys 153 and 154 to the pawl 127.

When the circuit is open and the solenoid winding 148 is de-energized, the weight 151 raises the pawl 127 out of engagement with the teeth 129 and the shaft oscillates without rotating that section of the slate gate. When, however, the slate bed acquires sufficient depth to raise the float element 134 in the cylinder 132 until the contacts 142 and 143 are engaged, the solenoid winding 148 is energized, raising the weight element 151 and permitting the pawl 127 to engage the ratchet teeth 129. That section of the slate gate will then continue to rotate until the depth of the slate bed is lowered sufficiently for the float element 134 to again fall and break the circuit.

By thus providing a sectional slate gate, with relatively short sections, and with a separate control for each section adjacent that section, I am enabled to maintain a uniform depth of slate bed over the entire screen at all times.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:—

1. In a jig, a screen, a hutch for the screen, a pulsion tank extending downwardly into the hutch a substantial distance below the screen, a bottom for the pulsion tank, a rotary valve in the bottom of the pulsion tank coextensive in length with the screen for establishing communication with the hutch, a suction tank alongside the hutch, a common wall between the suction tank and the pulsion tank, a propeller type pump disposed in said wall to force water from the suction tank into the pulsion tank, a rotary valve for establishing communication with the hutch and the suction tank, and means to drive the rotary valves in synchronism and establish communication alternately between the pulsion tank and hutch and suction tank and hutch.

2. In a jig, a hutch, a screen along one side of the hutch, a pulsion tank alongside the screen and extending downwardly into the hutch to a distance substantially equal to the length of the screen, a suction tank alongside the hutch, a common wall between the suction tank and the pulsion tank, means for supplying water to the suction tank, a means in the common wall for pumping water from the suction tank into the pulsion tank, and valve means for alternately connecting the pulsion tank and the suction tank to the hutch.

3. In a jig, a hutch, a screen over one side of the hutch, a pulsion tank over the hutch and alongside the screen, said pulsion tank extending downwardly below the screen substantially the length of the screen and comprising in its upper portion an air sealed chamber, a suction tank alongside the hutch, a common wall between the suction tank and the pulsion tank, means for supplying water to the suction tank, a propeller type pump disposed in the common wall near the bottom of the pulsion tank, and rotary valve means coextensive in length with the width of the screen and adapted alternately to connect the pulsion tank and suction tank with the hutch.

4. In a jig, a hutch, a screen over one side of the hutch, a pulsion tank over the hutch and alongside the screen, said pulsion tank extending downwardly below the screen substantially the length of the screen and comprising in its upper portion an air sealed chamber, a suction tank alongside the hutch, a common wall between the suction tank and the pulsion tank, means for supplying water to the suction tank, means for effecting a velocity pressure conversion of water from the pump in the pulsion tank, a propeller type pump disposed in the common wall near the bottom of the pulsion tank, and rotary valve means coextensive in length with the width of the screen and adapted alternately to connect the pulsion tank and suction tank with the hutch.

5. In a jig, a hutch, a screen over one side of the hutch, a pulsion tank over the hutch and alongside the screen, said pulsion tank extending downwardly below the screen substantially the length of the screen and comprising in its upper portion an air sealed chamber, a suction tank alongside the hutch, a common wall between the suction tank and the pulsion tank, means for supplying water to the suction tank, means for effecting a velocity pressure conversion of water from the pump in the pulsion tank, means for relieving excess air pressure in the upper part of the pulsion tank, a propeller type pump disposed in the common wall near the bottom of the pulsion tank, and rotary valve means coextensive in length with the width of the screen and adapted alternately to connect the pulsion tank and suction tank with the hutch.

6. In a jig, a hutch, a screen on one side of the hutch, a pulsion tank along the other side of the hutch, co-extensive with the screen means defining a passageway leading from the pulsion tank to the hutch, valve means positioned in said passageway substantially co-extensive in length with the pulsion tank, and an air pressure chamber provided in the pulsion tank co-extensive in length therewith of sufficient volume for the air under pressure therein to force water upwardly through the screen upon the opening of the valve means.

7. In a jig, a hutch, a screen over the hutch, means for effecting intermittent upward pulsations of water through the screen, a suction tank alongside the hutch, means for varying the level of water in the suction tank above its connection with the hutch, and valve means for intermittently connecting the suction tank to the hutch between the upward pulsations of water through the screen.

8. In a jig, a hutch, a screen over the hutch, means for effecting intermittent upward pulsations of water through the screen, a suction tank alongside the hutch, means for maintaining a variable level of water in the suction tank above the inflowing water from the hutch, and valve means for intermittently connecting the suction tank to the hutch between the upward pulsations of water through the screen, and for relatively longer periods of time than the periods consumed in upward pulsations through the screen.

9. In a jig, a screen, a hutch, a pulsion tank connected to the hutch and having an air pressure chamber in the upper portion thereof, valve means interposed between the pulsion tank and the hutch, a suction tank connected to the hutch, means for maintaining a variable water level in the suction tank above the hutch level, valve means interposed between the suction tank and the hutch, and means to operate both the valve means in synchronism so that when one valve means is opened the other is closed.

10. In a jig, a screen, a hutch, a pulsion tank connected to the hutch and having an air pressure chamber in the upper portion thereof, valve means having a relatively short period of opening interposed between the pulsion tank and the hutch, a suction tank connected to the hutch, means to vary the water level in the suction tank above said hutch connection, valve means having a relatively long period of opening interposed between the suction tank and the hutch, and means to operate both the valve means in synchronism so that when one valve means is opened the other is closed.

11. In a jig, a screen, means for effecting impulses of water through the screen, a slate outlet, an oscillatory shaft positioned in said outlet, means for continuously oscillating the shaft, a plurality of rotary slate gates loosely mounted on the shaft, a ratchet on each slate gate, a pawl for each ratchet fixedly mounted on the shaft, and means responsive to the depth of the slate bed in front of each slate gate for controlling the engagement of the pawl with the ratchet.

12. In a jig, a screen, means for effecting impulses of water through the screen, an overflow weir, a slate outlet, a shaft in said outlet, means for continuously oscillating the shaft, a plurality of rotary slate gates loosely mounted on the shaft, a ratchet on each slate gate, a pawl for each ratchet fixedly mounted on the shaft, a feeler element mounted in front of each slate gate and comprising a perforate member adapted to rest on the slate bed, and an enclosing cylinder for the perforate member, and means responsive to the rise and fall of the perforate member responsive to the depth of the slate bed for controlling the engagement of the pawl with the ratchet.

13. In a control mechanism for the slate gate of a jig, a perforate feeler member adapted to rest on the slate bed and movable up and down in response to the depth of the bed, a stationary enclosing member open at its ends and surrounding the feeler member and extending downwardly into the bed of material being separated and through the lighter layer of material in the bed, means to dampen excessive upward movement of said feeler member and means responsive to upward movement of the feeler member for actuating the slate gate.

14. In a jig, a hutch, a screen over the hutch, a pulsion tank alongside the screen, said pulsion tank being adapted to trap a body of air in its upper portion, means for forcing water into the pulsion tank to accumulate it therein and compress said body of trapped air above it, and means separating the tank and the hutch including valve means for periodically releasing water under pressure from said pulsion tank into the hutch to force an up surge of water through said screen.

15. A jig according to claim 14 in which the pulsion tank is adapted to trap air under pressure over substantially the whole surface area of the body of water as it is accumulated therein.

16. In a jig, a hutch, a screen disposed to receive pulsations of water from said hutch, a pulsion tank, means separating the pulsion tank and the hutch including a valve controlled outlet opening into the hutch for delivering pulsations of water thereto, means to accumulate water in said tank under pressure to supply said pulsations, said tank having substantial cross sectional area so that the body of water accumulated therein for a pulsation will have an extensive surface area, said pulsion tank being closed overhead and containing a body of air adapted to be compressed by the accumulating body of water in the pulsion tank, and means for effecting a periodic discharge of water pulsations from said tank.

17. A jig according to claim 16, in which the pulsion tank maintains the body of compressed air over the entire surface area of the body of water therein and the pulsion tank is disposed alongside of and is substantially coextensive in length with said screen.

18. In a jig, a hutch, a screen disposed to receive impulses of water from the hutch, and means to produce said impulses of water in the hutch comprising a tank of substantial cross sectional area adapted to contain a body of air trapped therein, means to continuously force water for producing said impulses into said tank and in doing so to compress the air therein above the water, means to regulate the volume of air trapped above the accumulating water in said tank, and means separating the hutch and the pulsion tank including intermittently operable valve means for controlling the discharge of pulsations of water from said tank into the hutch.

19. In a jig, a hutch, a screen disposed to receive impulses of water from the hutch, and means to produce said impulses of water in the hutch, comprising a tank of substantial cross sectional area and means to trap a predetermined volume of air therein, means to force water under pressure and with a regulable rate of flow into said tank to accumulate it therein and to compress the trapped air above it, and means separating the hutch and the pulsion tank including valve means operable at fixed intervals and for predetermined periods to discharge into the hutch the bodies of water accumulated under pressure in said tank.

20. A jig mechanism acording to claim 19, in which the means for forcing water into the pulsion tank is a variable speed pump.

21. In a jig, a hutch, a screen disposed to receive pulsations of water from said hutch, a means to admit intermittent pulsations of water thereinto under pressure, a suction tank having a valve controlled communication with the hutch opening into the suction tank below its water level, means to fix the water level in said tank so as to control the rate of inflow of water from the hutch, and a mechanism for intermittently connecting the hutch and tank.

22. In a jig, a hutch, a screen disposed to receive pulsations of water from said hutch, a pulsion tank having a valve controlled outlet port in communication with said hutch, means to force a water supply into said tank, means to trap above the water in said tank a body of air under sufficient pressure to forcibly discharge said water into the hutch, a suction tank having a valve controlled inlet port in communication with said hutch, means to maintain in said suction tank a variable head of water at a level adapted to control the rate of inflow of water from said hutch, and valve mechanism for connecting the hutch alternately with said tanks.

23. A jig mechanism according to claim 22, in which the means for forcing water into the pulsion tank is a variable speed pump having its intake opening into the suction tank.

24. A jig mechanism according to claim 22, in which the means for forcing water into the pulsion tank takes its supply of water from the suction tank and the suction tank has an adjustable wier for the removal of surplus water and the controlling of the water level therein.

25. A slate bed level controlling mechanism, combining a perforated disk plunger adapted to rest upon the slate bed and movable in response to variations in the top level of the bed, a plunger rod to transmit the motion of the plunger vertically, a slate gate actuating device responsive to the vertical movements of the plunger rod, and a fixed enclosing vertical guide cylinder for the plunger extending downward into the slate bed from above the water level in the jig tank, and being open for the free flow of air or water in substantial volume only at its bottom and at its top above the water level.

26. A slate bed level controlling mechanism, comprising in combination a perforated disk plunger adapted to rest upon the slate bed and mounted for vertical movement responsive to variations in the top level of the bed, a vertical plunger rod to transmit the motion of said disk plunger, a second disk mounted on said rod and above the normal water level in the jig, a dampening cylinder coacting with the upper disk to dampen excessive movement of said rod, a slate gate actuating device responsive to the movement of the rod, and a vertical guide cylinder enclosing the lower plunger and extending downward into the slate bed and upward above the level of the water in the jig, said cylinder being open at its bottom end and near its upper end so as to substantially equalize air pressure in the top of the cylinder with the surrounding atmosphere.

27. In a jig, a hutch, a screen on one side of the hutch, a pulsion tank along the other side of the hutch, means defining a passageway leading from the pulsion tank to the hutch, valve means positioned in said passageway, an air pressure chamber provided in the pulsion tank of sufficient volume to force water upwardly through the screen upon the opening of the valve means, a suction tank in communication with the hutch, means for varying the level of water in the suction tank above its connection with the hutch, and means for transferring water from the suction tank to the pulsion tank.

MARTIN J. LIDE.